April 13, 1954

R. H. GRIFFIN 2,674,832

BUFFING MACHINE

Filed Nov. 10, 1949

INVENTOR
Robert H. Griffin,

BY Wilmer Mechlin

ATTORNEY

INVENTOR
Robert H. Griffin,
BY Wilmer Mechlin
ATTORNEY

April 13, 1954 R. H. GRIFFIN 2,674,832
BUFFING MACHINE
Filed Nov. 10, 1949 10 Sheets-Sheet 3

INVENTOR
Robert H. Griffin,
BY Wilmer Mechlin
ATTORNEY

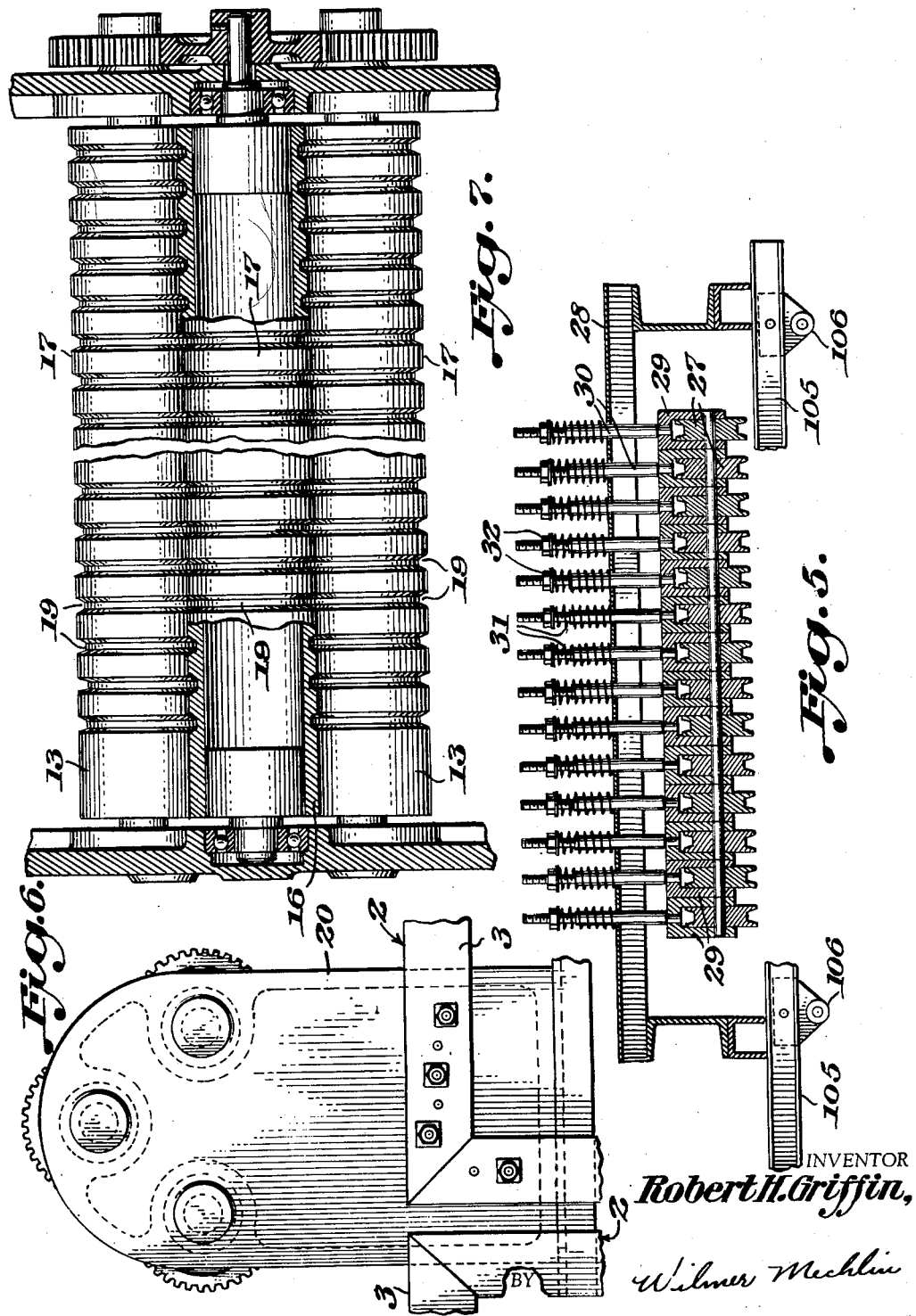

April 13, 1954 R. H. GRIFFIN 2,674,832
BUFFING MACHINE

Filed Nov. 10, 1949 10 Sheets-Sheet 5

INVENTOR
Robert H. Griffin,
BY Wilmer Mechlin
ATTORNEY

April 13, 1954  R. H. GRIFFIN  2,674,832
BUFFING MACHINE
Filed Nov. 10, 1949  10 Sheets-Sheet 6
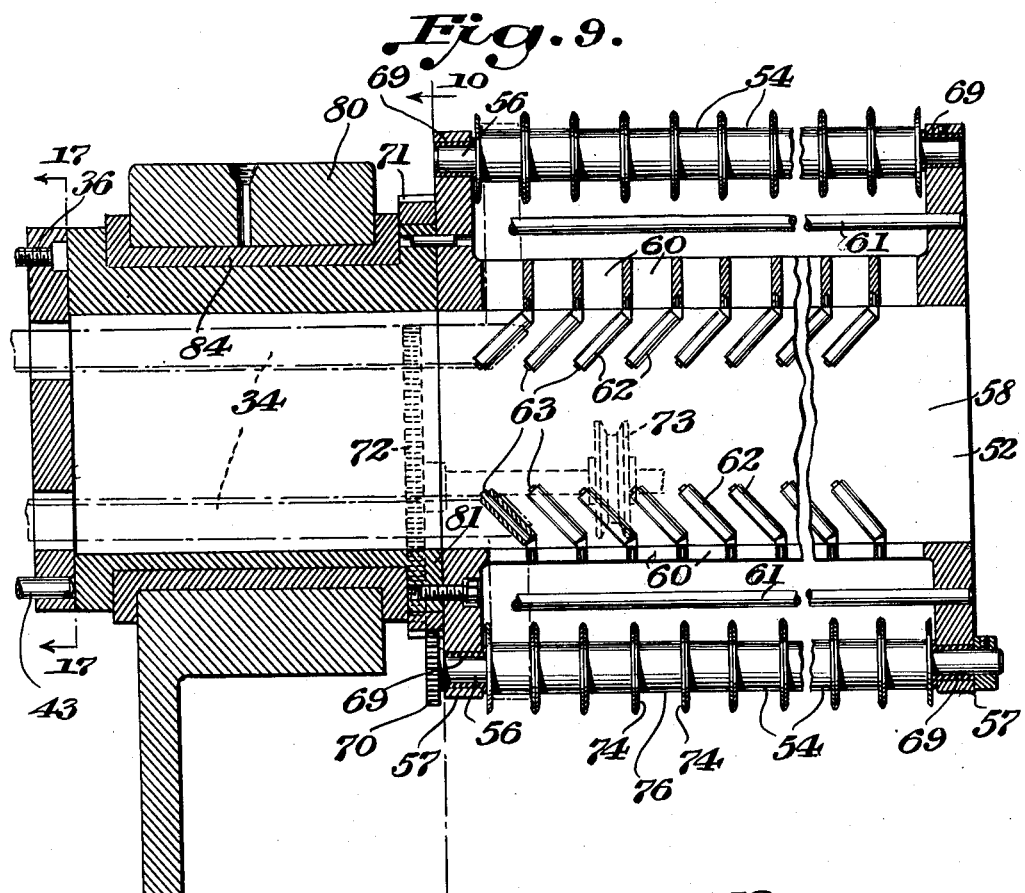
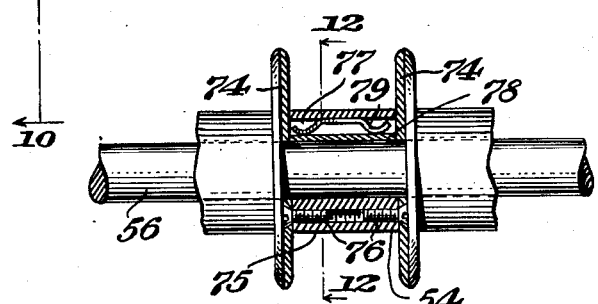
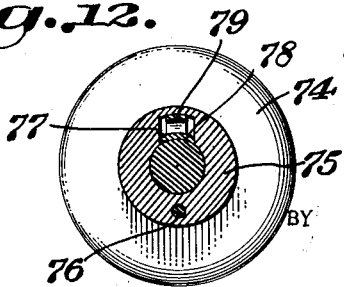
INVENTOR
Robert H. Griffin,
BY Wilmer Mechlin
ATTORNEY

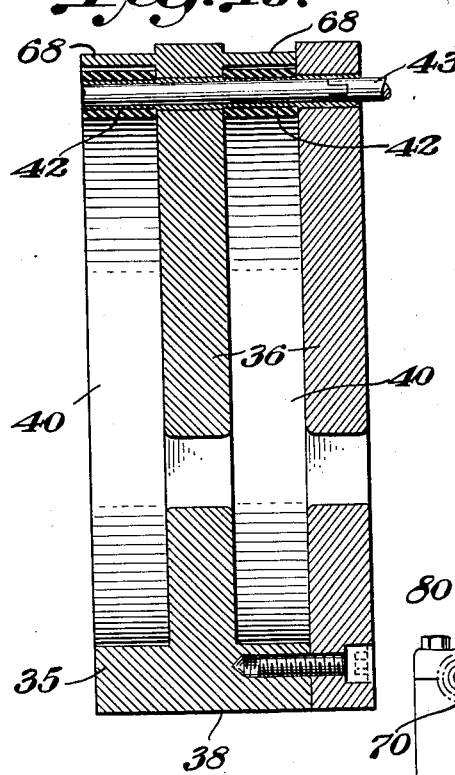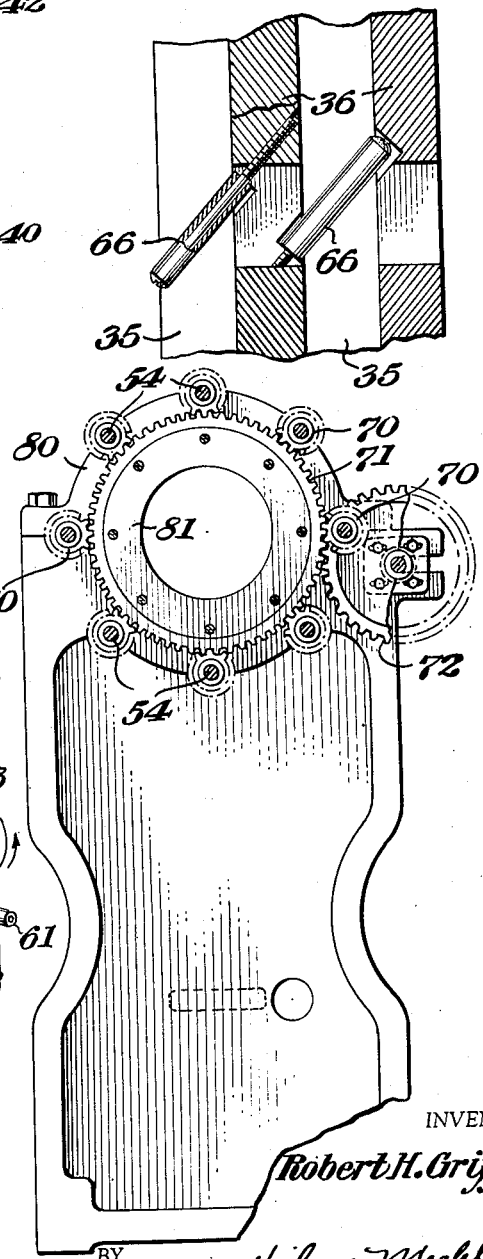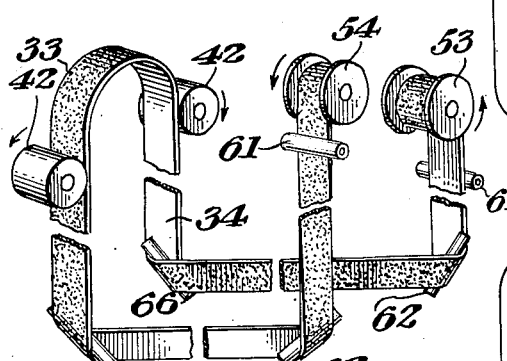

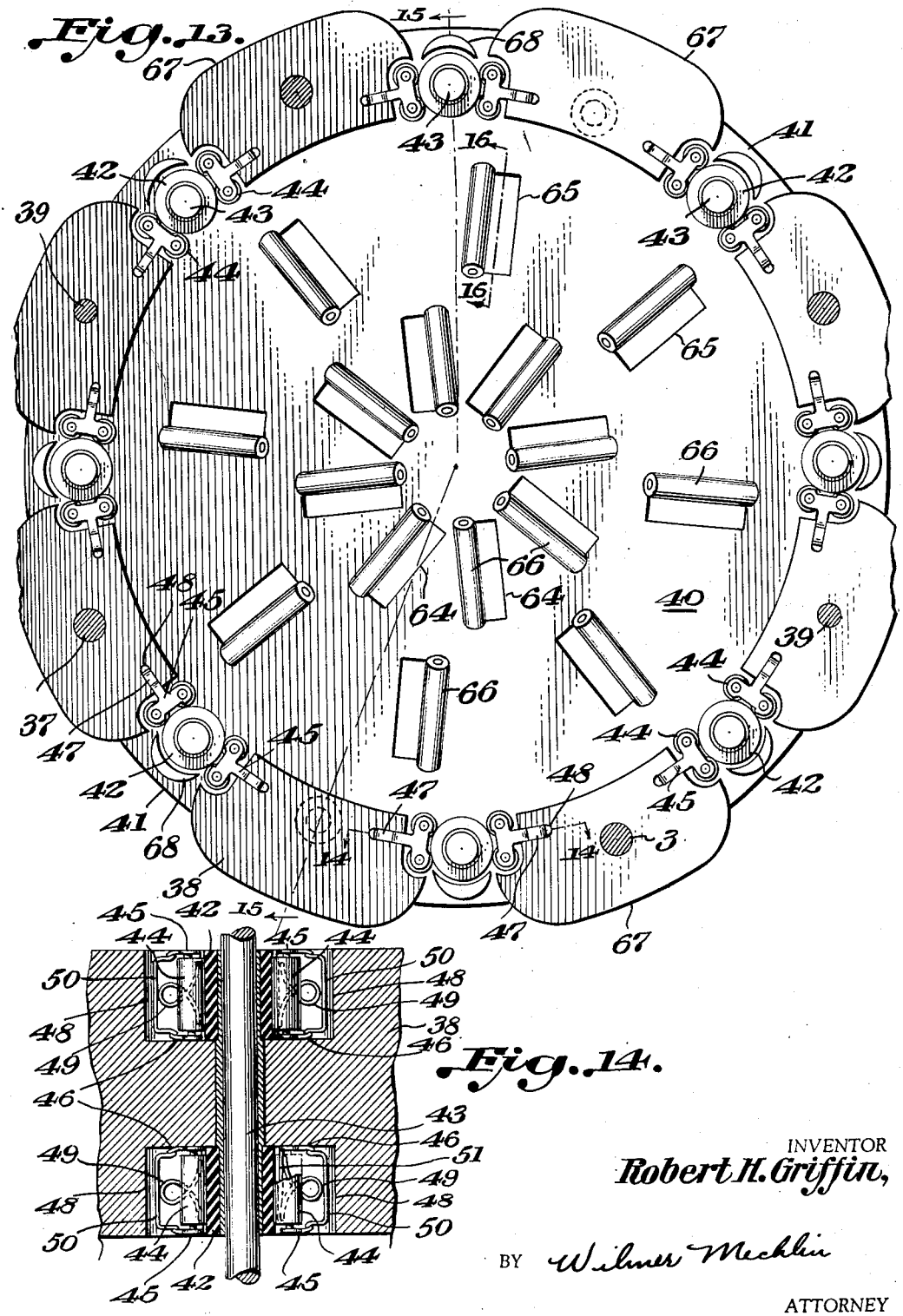

April 13, 1954 R. H. GRIFFIN 2,674,832
BUFFING MACHINE
Filed Nov. 10, 1949 10 Sheets-Sheet 9
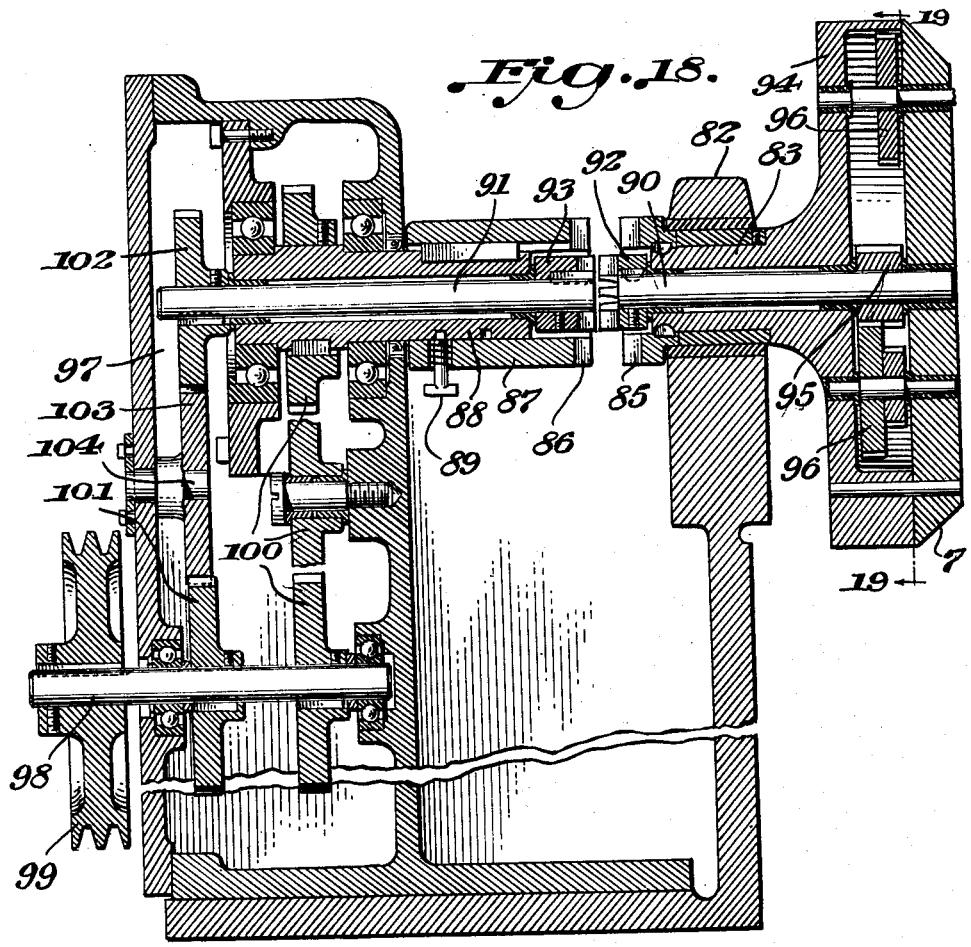
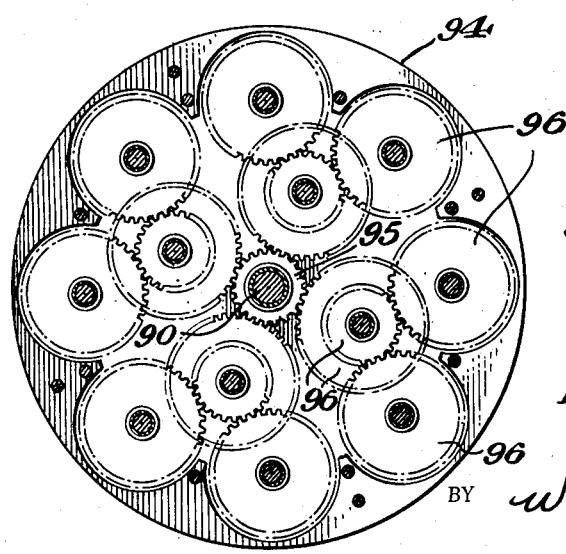
INVENTOR
Robert H. Griffin,
BY Wilmer Mechlin
ATTORNEY

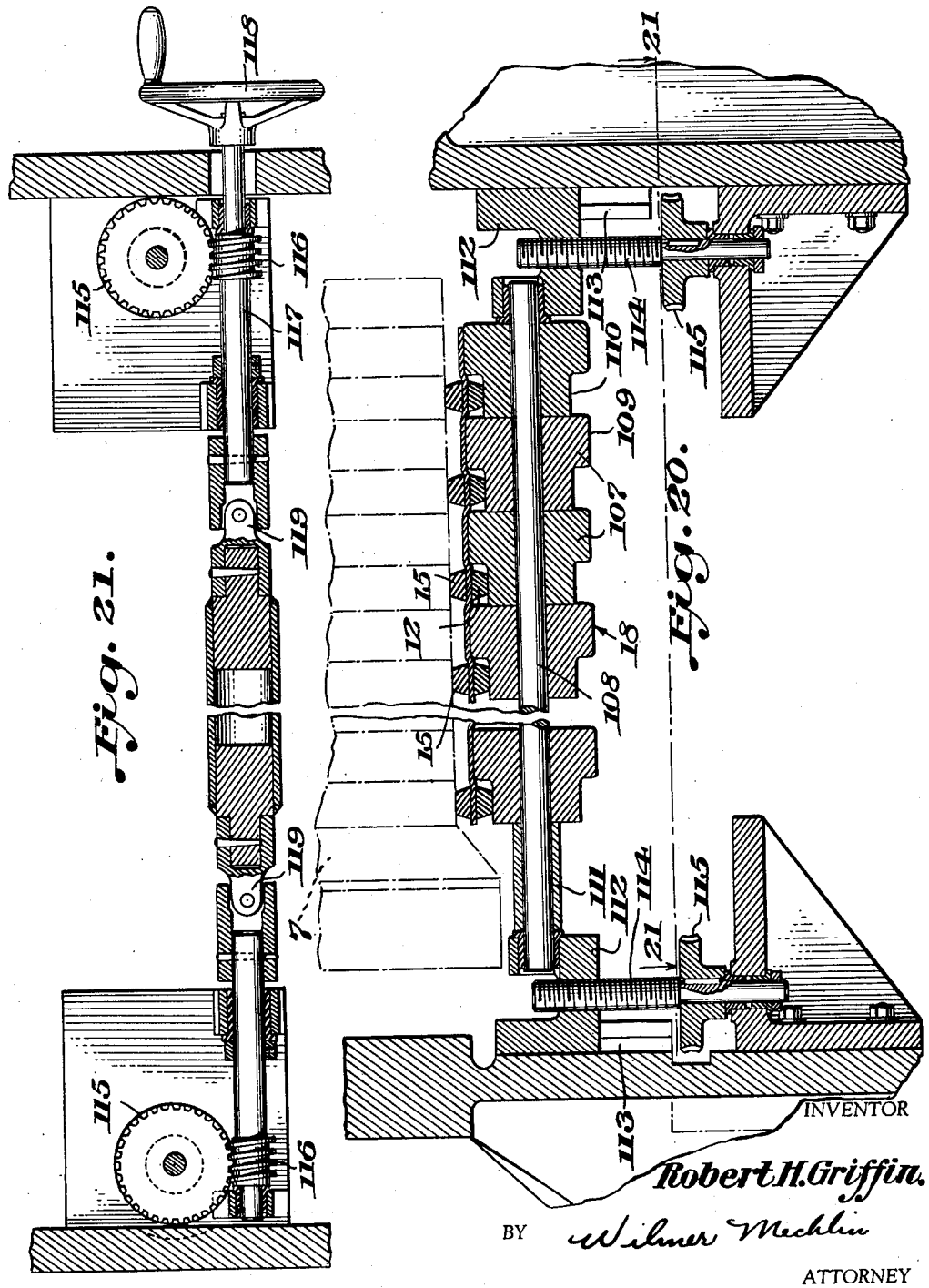

Patented Apr. 13, 1954

2,674,832

UNITED STATES PATENT OFFICE 2,674,832

BUFFING MACHINE

Robert H. Griffin, Yonkers, N. Y., assignor to Tanners' Research Corporation, New York, N. Y., a corporation of Delaware Application November 10, 1949, Serial No. 126,546

20 Claims. (Cl. 51—76)

This invention relates generally to abrading machines and more especially to buffing machines which, while of application to sheet material in general, are particularly adapted for buffing hides.

Hides, skins and the like, hereafter termed generally "hides," are subjected to abrasion to remove a portion of a side or surface of the hide. While known as "buffing" for the flesh side and "snuffing" for the grain side, this treatment will be referred to, hereunder, as buffing. In such buffing, it has heretofore been the practice to utilize a single buffing roll, between which and a back-up roll a hide is fed by hand. Usually, one end of the hide is held by the operator while the remaining portion is being buffed, a complete buffing thus requiring at least two passes under the buffing roll. The buffing rolls so employed generally utilize sandpaper as the abrading medium, usually in the form of a single endless cylinder surrounding the roll and, less frequently, as flaps or ends which are urged into contact with the hide by some type of resilient backing. In either case, the abrasive in contact with the hide must frequently be replaced as the abrading surface is worn away, such replacement now being done by hand. Another incident of buffing is that a given hide must usually be subjected in succession to coarse and relatively fine abrasives before its buffing is completed. For the single buffing roll now in use, buffing thus entails a minimum of four passes, two on each of two separate machines.

The primary object of the present invention is to provide an improved buffing machine for buffing hides and other sheet work whereby the work is buffed in a single pass.

Another object of the invention is to provide a buffing machine for buffing a plurality of hides as a continuous operation.

An additional object of the invention is to provide a buffing machine for buffing hides as a continuous operation wherein the abrading medium is constantly and automatically renewed.

A further object of the invention is to provide a buffing machine having a work-supporting conveyor by which the entire surface of a hide is presented for buffing without the use of clamps or other extraneous gripping devices.

A further object of the invention is to provide a buffing machine of sectional construction whereby the machine may be readily adapted for buffing hides of a wide range of widths and subjecting such hides to buffing as a continuous operation by abradents of different degrees of fineness.

Another object of the invention is to provide a buffing machine employing as its abrading medium a plurality of loops of abrasive material which are brought into contact with a hide solely by centrifugal force, thus inhibiting burning of the hide during buffing.

A further object of the invention is to provide a buffing machine for buffing hides as a continuous operation wherein the depth of cut is readily adjustable and held within close tolerances.

An additional object of the invention is to provide a buffing device utilizing spooled abrasive tape as its buffing medium, having means for continuously feeding and renewing the tape while maintaining its linear speed substantially constant throughout the device, regardless of the amount of tape wound on the spools.

Other objects and advantages of the invention will appear hereinafter in the detailed description, be particularly pointed out in the appended claims and illustrated in the accompanying drawings in which:

Figure 5 is a fragmentary cross-sectional view on an enlarged scale, taken along the lines 5—5 of Figure 2;

Figure 6 is a fragmentary side elevational view on an enlarged scale, showing one of the belt roller units of Figure 2;

Figure 7 is a plan view on an enlarged scale of the unit of Figure 6;

Figure 9 is a fragmentary cross-sectional view, showing the spool cage and related structure and taken along the lines 9—9 of Figure 8;

Figure 10 is a cross-sectional view on a reduced scale, taken along the lines 10—10 of Figure 9;

Figure 11 is a view on an enlarged scale of a fragment of one of the spindles of Figure 9, showing a typical spool in longitudinal section;

Figure 12 is a transverse sectional view, taken along the lines 12—12 of Figure 11;

Figure 13 is a fragmentary vertical sectional view on an enlarged scale, taken along the lines 13—13 of Figure 3, showing in end elevation a ring section of the drum;

Figure 14 is a fragmentary cross-sectional view taken along the lines 14—14 of Figure 13;

Figure 15 is a fragmentary cross-sectional view on a reduced scale, taken along the lines 15—15 of Figure 13;

Figure 16 is a fragmentary cross-sectional view, taken along the lines 16—16 of Figure 13;

Figure 18 is a fragmentary vertical sectional view on an enlarged scale, taken along the lines 18—18 of Figure 2 showing the drive mechanism of a drum and its drive rolls;

Figure 19 is a vertical sectional view, taken along the lines 19—19 of Figure 18;

Figure 20 is a fragmentary sectional view on an enlarged scale, showing the details of construction of the backup roll and attendant adjusting mechanism of Figure 3;

Figure 21 is a horizontal sectional view, taken along the lines 21—21 of Figure 20;

Figure 22 is a schematic view showing the path of travel of a typical abrasive tape from its feed spool through the related drive rolls to its rewind spool.

Figure 1:
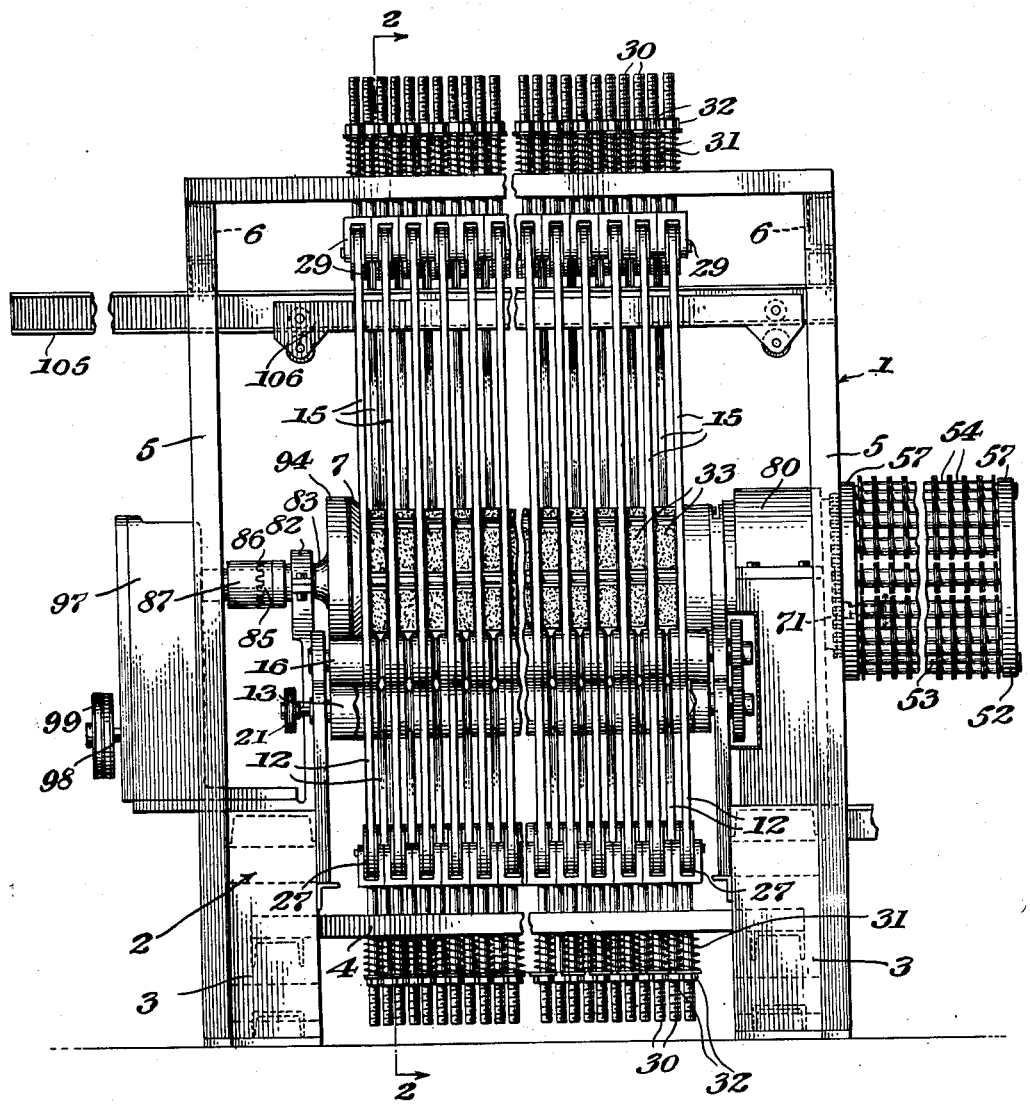
Figure 1 is an end elevational view of the improved machine of the present invention, with the discharge conveyor removed and its end roller broken away to more clearly illustrate the relation between the several belts.

Referring now in detail to the drawings in which like reference characters designate like parts, the improved buffing machine of the present invention in its illustrated form is particularly adapted to the buffing of hides. For such purpose, the machine is provided with a frame 1 which may be constructed of suitable structural shapes. The base of the frame is preferably formed of a plurality of subframes, base units or members 2, bolted, welded or otherwise connected to each other longitudinally of the frame and each having its transversely spaced sides 3 joined or connected by one or more cross-members 4 of the necessary strength and configuration, the illustrated inverted channel members being particularly suitable for this purpose. Connected to either side of the base and projecting thereabove are a plurality of spaced uprights or supports 5 which are joined adjacent their upper ends by longitudinal and transverse beams or structural members 6.

Supported by the frame 1 and disposed transversely thereacross above the base members 2 are a plurality of longitudinally spaced buffing drums, rolls, rotary members or treating devices 7. As shown, these drums are arranged in a plurality of pairs, each of which is designed to buff an entire surface of a hide, succeeding pairs thus being enabled to subject a hide successively to buffing by finer abrading mediums in order that the hide may be buffed completely in a single pass or travel through the machine.

In the disclosed embodiment, the several buffing drums rotate on fixed axes and a hide is presented thereto by a movable support or conveyor 8. To function effectively, this conveyor is required not only to present an entire surface of a hide to each pair of drums, but to cause the hide to be gripped to the moving surface of the conveyor so as to prevent slippage or displacement during treatment. A conveyor system especially suited for these purposes is that best shown in Figure 2. As there shown, there are provided at corresponding ends of the machine, feed and discharge conveyors numbered 9 and 10, respectively, between which are disposed the several conveyor units 11, one associated with each of the drums 7 by which a hide is carried during treatment. For continuity of support, the feed and discharge, as well as the intermediate conveyors, are each formed of a multiplicity or plurality of transversely or laterally spaced endless belts or V-belts 12 of rubber or other suitable material, the belts of each conveyor overlapping and being interlaced, interspersed or intercalated between those of the adjoining conveyor. While the desired overlap might be obtained by carrying the contiguous or adjacent ends of the overlapping conveyors on a common roller, it has been found preferable, in order to avoid interference with a hide by certain other structure, to increase the extent of overlap by utilizing an individual roller 13 for the belts of each conveyor and mounting these rollers so that the roller carrying or encircled by the leading end of a succeeding conveyor is positioned or disposed in advance of the roller carrying or encircled by the following end of its predecessor. Each of these rollers is multi-grooved for accommodating or receiving the belts of the associated conveyor, and since all but the rollers at the extremities of the movable support also confront the belts of adjoining conveyors, these rollers preferably have sufficient grooves to accommodate the confronting belts as well.

Gripping of a hide to the supporting conveyor 8, to obtain positive feed of the hide through the machine and avoid any slippage under the buffing drum, is accomplished by a plurality of gripping devices 14, each comprising a set or group of laterally spaced continuous belts or V-belts 15, each overlying or confronting and adapted to engage the belts 12 of one of the conveyors of the supporting conveyor. For continuity, the gripping belts also overlap and are interleaved, interspaced or intercalated with gripping belts of adjoining sets, here through the provision of common multi-grooved rollers, hereafter termed gripping or upper rollers 16, carrying or encircled by the overlapping belts of adjoining grippers. From Figure 1, it is evident that the gripping belts of adjoining sets are staggered in the same manner as the belts of the supporting conveyors, such that a belt of each type confronts and is adapted to engage or abut a belt of the other type. Accordingly, a hide travelling through the machine is at all times gripped between confronting belts and, by virtue of the staggered relation of successive belts, is enabled to have first one portion and then the balance of its surface exposed to buffing or treatment by each pair of drums 7, the portions so exposed being spaced longitudinal strips.

Figure 2:
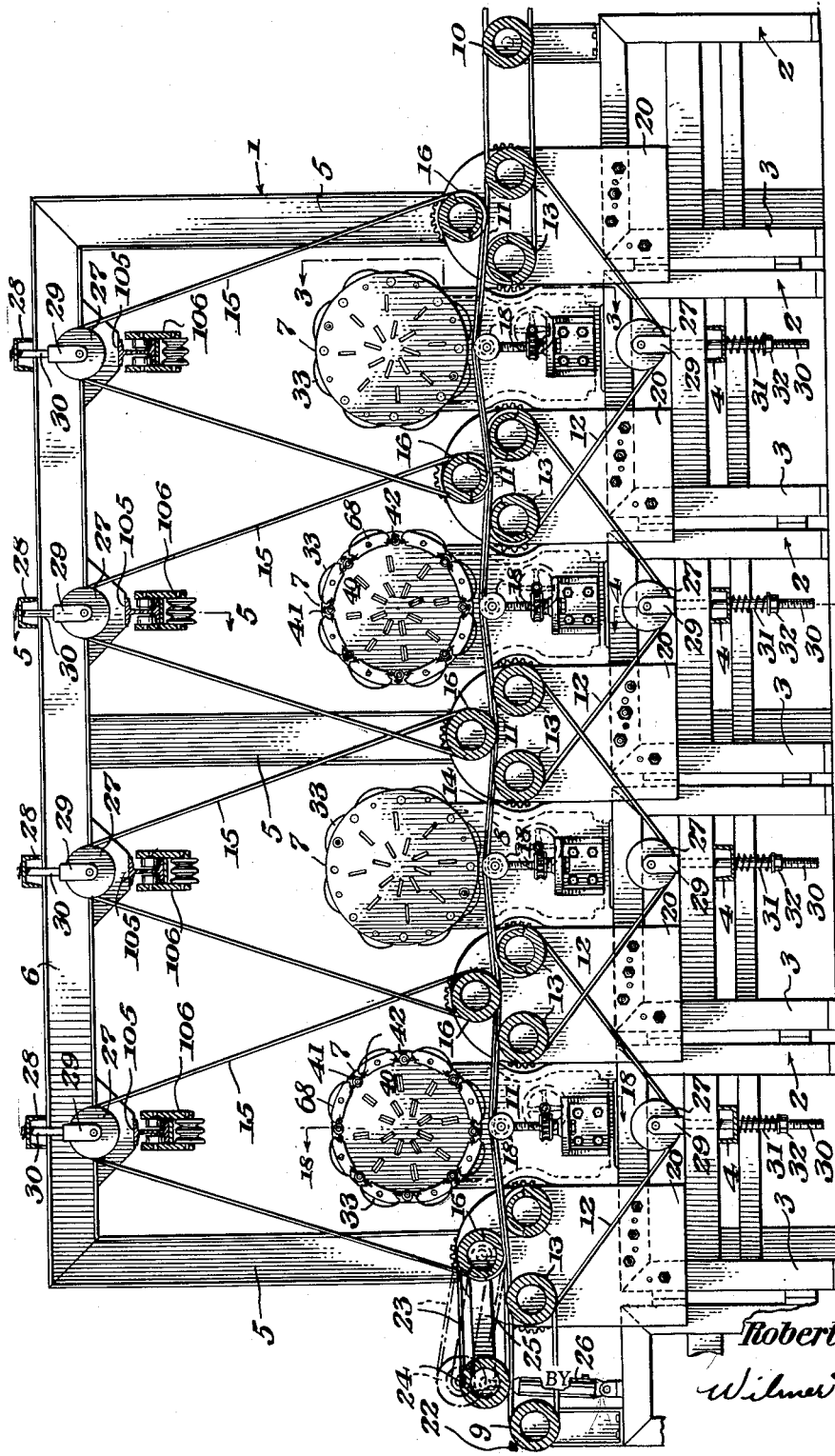
Figure 2 is a longitudinal sectional view of the machine, taken along the lines 2—2 of Figure 1, with portions broken away to more clearly illustrate certain of the details of construction.

While a hide is presented to the several buffing drums by the confronting conveyors between which it is gripped, the exposed portion actually undergoing treatment is supported directly on the outer surface or periphery 17 of a back-up roll 18 positioned intermediate the belt-carrying rollers, each of the back-up rolls having this surface interrupted by a plurality of spaced grooves 19 for receiving and supporting the confronting belts. As shown in Figure 2 and in more detail in Figures 6 and 7, the rollers 13 of the supporting conveyor, except for the end rollers, are arranged in pairs for mounting purposes, each pair being mounted with the associated of the upper rollers 16 in a set on a stand 20 carried by the frame 1, with the rollers geared or connected for rotation in synchronism through the upper roller. With this construction, it is possible to drive the belts of the entire conveying system through a single take-off or drive pulley 21 which, for illustration, has been fixed to the shaft of the pulley at the discharge end of the machine.

There is provided at the feed end of the machine a feed table 22 of suitable type, on which a hide is initially placed to afford a surface for spreading or smoothing out the hide before its introduction into the machine. To facilitate feeding of a hide from the feed table into the machine, it has been found preferable to enable the gripping device or feed gripper 23 associated with the feed conveyor to be elevated by the operator as each hide enters. To this end, the lead roller 24 of the feed gripper 23 is journaled on links 25 carried by the support 20 of its following roller and the outer ends of the links are carried on pneumatic cylinders or like means 26, operated by a conventional foot pedal or other suitable control, not shown, by which the operator is enabled to raise the leading or feed end of the gripper to the position shown diagrammatically in Figure 2, as each hide is introduced. After introduction, the roller is lowered to its normal position shown in solid line, thereafter gripping the hide between the confronting belts of the gripper and feed conveyor.

Elimination of slack resulting from stretching of the belts encircling the end rollers at the two extremities of the movable support is readily accomplishable through any suitable means for pressing the axes of these rollers outwardly relative to their companion rollers, a resilient displacement being preferable to maintain the belts taut at all times. The same result is achieved for the belts of the intermediate conveyors 11 and their associated gripping belts 15 by take-up pulleys 27 mounted, above and below the intergeared sets of rollers 13 and 16, on the aforementioned cross-members 4 of the base members 2 and corresponding cross-members 28 carried by the uprights 5. To compensate for variations in stretch among the several belts, a pulley is provided for each belt and each pulley is journaled in an individual yoke 29 having a stem 30 projecting through the associated cross-member and carrying outwardly thereof resilient means in the form of a coil spring 31, held on the stem by a nut 32, for resiliently urging the yokes outwardly and thereby tautening the associated belt.

It has been previously mentioned that each of the pairs of buffing drums 7 has presented to it for treatment an entire surface of a hide and that each drum of the pair is designed to buff substantially half of that surface, the remainder of the surface in each case being obscured by the gripping belts 15 by which the hide is gripped to the confronting belts of the supporting conveyor 9. As a consequence, only that portion of the surface of each drum intermediate the gripping belts need carry abrasive, this also being desirable to prevent contact between the abrasive and the gripping belts with consequent undue wear of the latter. If only limited by the spacing of the gripping belts, each drum might be provided with spaced rings of abrasive. However, experience in buffing hides has shown that such rings of abrasive, even when resiliently backed, tend to burn or scorch a hide, and that the lightest possible touch or contact between abrasive and hide, consistent with buffing, is essential. The device of the present invention is designed not only to satisfy this requirement, but to provide means whereby the abrasive medium is continuously and automatically renewed, thus permitting an unlimited number of hides to be buffed in succession as a continuous operation. Supplying the requisite lightness of contact with a hide, the abrasive medium is in the form of a plurality of peripherally carried free or untensioned loops 33 arranged in groups spaced laterally in correspondence with the spacing of the exposed portion of the hide, each loop being part of an elongated strip or tape 34 of flexible abrasive, such as sandpaper, and being continuously renewed by feeding of the strip in the manner to be now described.

Figures 3, 4:
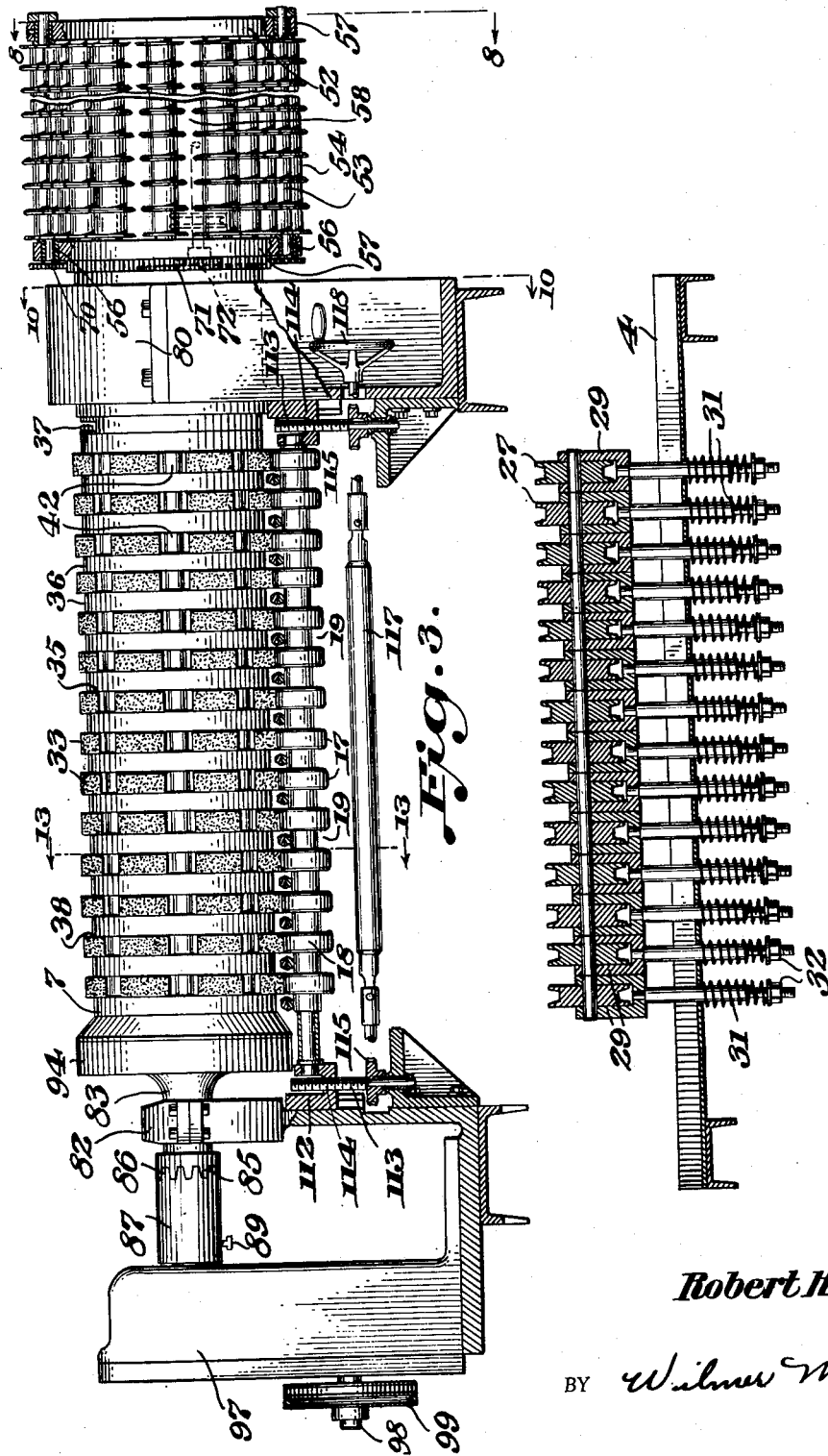
Figure 3 is a cross-sectional view on an enlarged scale showing a drum assembly, taken along the lines 3—3 of Figure 2, with portions broken away and shown in section to more clearly illustrate certain of the details of construction.
Figure 4 is a fragmentary cross-sectional view on an enlarged scale, taken along the lines 4—4 of Figure 2.
Figure 8:
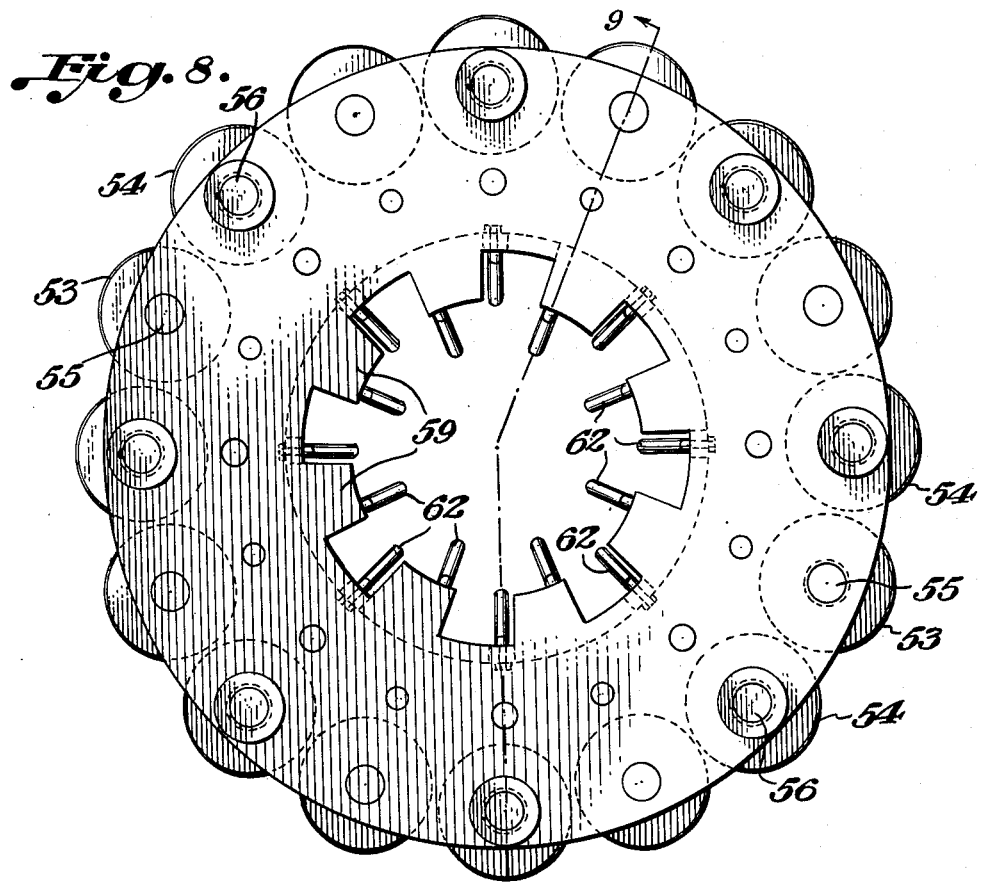
Figure 8 is an end elevational view on an enlarged scale of a spool cage, taken along the lines 8—8 of Figure 3.
Figure 17:
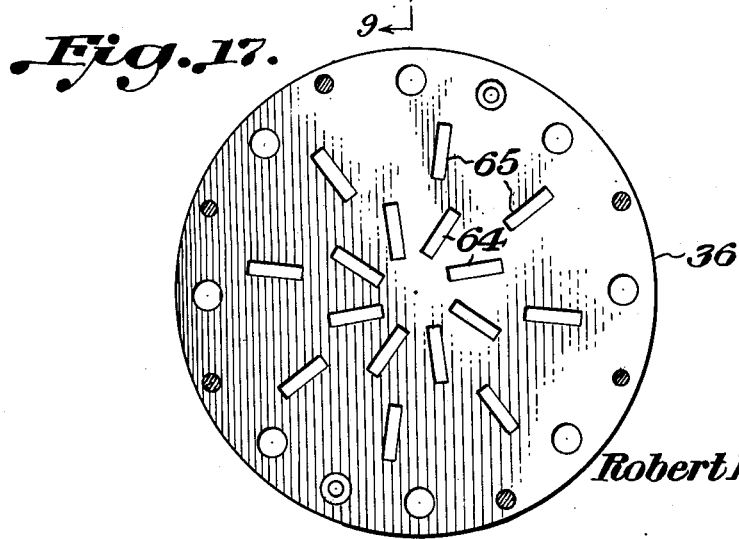
Figure 17 is a cross-sectional view, taken along the lines 17—17 of Figure 9, showing in end elevation a disc section of the drum.

As shown in Figure 3, each of the drums 7 is comprised of a plurality of sections, segments or elements, of substantially equal width, in the form of abrasive loop-carrying or buffing rings 35 alternating with and spaced by spacers or spacer discs 36, these members being detachably connected to form the body of the drum by tie bolts 37. To facilitate construction as well as subsequent handling, the rings are arranged in pairs, each pair being attached to and preferably integral with the intervening spacer to form a ring member 38. To reduce the strain on the tie bolts 37, it is also preferred to bolt or otherwise detachably secure to one side of each of the ring members one of the separate discs, and further to interconnect these elements by drift pins 39.

The spaced compartments or chambers 40 within the rings 35, into which the interior of the drum is divided by the discs 36, serve to house the means whereby the abrasive in the loops 33 is continuously or progressively renewed. For this purpose, the peripheral wall or rim of each of the rings 35 is interrupted by a plurality of laterally or circumferentially spaced or arranged openings or passages 41, in or associated with each of which is mounted a drive roll 42, faced with rubber or other relatively non-slip material. For simplicity of operation, the drive rolls of the several segments are positioned in alignment and the rolls of each line or row are mounted on a common drive shaft 43, the drive shafts, like the drums, being formed of a plurality of interlocking sections. Confronting and adapted to bear against opposite faces of each of the drive rolls are pressure or bearing rolls 44 for holding the abrasive strips in tight contact with the drive rolls. In the form shown, the pressure rolls are arranged in pairs, one mounted or seated in the ring 35 on either side of the drive roll. The rolls of each pair are journaled in a carriage 45 having side plates 46 of T-section, the stems 47 of which slide in a correspondingly-formed recess 48 in the rim, being resiliently urged therefrom by a spring 49 of loop or other suitable shape. The spring preferably bears directly against a cap member 50 which abuts the inner end of the recess and is interlocked between the side plates for limited sliding or reciprocable movement of the latter relative thereto. The bottom portion of the spring may be carried on a web 51 connecting the side plates 46. So formed, the pressure rollers 44 are readily mounted as a unit in their respective recesses, and once positioned, are adapted resiliently to exert the pressure necessary to maintain driving contact between the drive roll and the abrasive tape.

It will be apparent that no provision is made for spooling the abrasive tape 34 within the compartments 40 of the several ring members 36. Instead, the tape is made readily accessible by the provision of a tape-carrying hollow cylinder, cage or member 52 connected to one end of each drum 7 and rotatable therewith, the tape being carried on the cage 52 in spools. In the illustrated embodiment in which a separate tape 34 is utilized for each of the several abrasive loops 33, there is provided for each of the tapes a feed or supply spool 53 and a take-up, drive or rewind spool 54, on each of which its opposite ends are wound. The corresponding drive rolls 42 of the several loop-carrying rings 35 of the drum, as well as the loops 33, being aligned in longitudinally extending, circumferentially spaced rows, a like disposition of the spools is preferred to avoid interference between the tapes of the respective rows. Thus, there are mounted about the spool-carrying cage in circumferentially spaced relation a plurality of spindles or shafts 55 and 56, each carrying either the feed spools or take-up spools of one row of loops, with the spindles 55 of the feed spools and those 56 of the take-up spools alternating, and the feed and takeup spools of each row of loops adjacent each other.

The ends of the several spindles 55 may be mounted in annular flanges 57 formed at either end of the cage 52, with the axes of the spindles preferably disposed parallel to that of the cage. The cage has an axial substantially cylindrical bore 58, having its wall interrupted by a plurality of spaced longitudinally extending ribs 59. To afford access of the tape to the bore or hollow interior 58 of the cage, there are provided in the intervening wall a plurality of longitudinally extending rows of spaced passages or slots 60, one passage for and substantially in line with each of the spools, alignment of each tape with its passage being assured, regardless of the amount of tape wound on the spool, by the provision of guide rods 61 adjacent the spools over which the tapes run intermediate the spools and their respective passages. The action of the guide rods is indicated in Figure 22, wherein is shown schematically the path of a typical tape.

The cage 52 being attached to one end of the drum, the tapes must travel substantially axially or longitudinally of the drum from the cage to the loop-carrying rings 35. To accomplish the change from the initial radial to this axial direction, there is associated with each of the passages 60 a direction-changing idler roller 62, which may conveniently be attached to the wall of the bore 58, intermediate the passages, by a stud 63. Disposed at substantially a forty-five degree angle axially of the cage for the desired ninety degree change of direction, the rollers enable the tape to accomplish this smoothly and without breakage. It will be seen that the several rollers, like the spools 53 and 54 and drive rolls 42, are arranged in rows such that the tapes of each row are caused to travel together as they enter the buffing drum, those of the feed spools being spaced inwardly radially of the cage to minimize interference by mounting them on the ribs 59.

To enable the tapes to pass through the spacer discs 36 of the drum to reach their several stations, each of the discs is apertured or interrupted by a plurality of substantially rectangular slots or apertures 64 and 65, a pair of slots being provided for each line of tapes, one, an inner or feed slot 64, for the new tape drawn from the feed spools and the other, an outer or take-up slot 65, for used tape withdrawn by the take-up spools. To afford continuous conduits or channels through the body of the drum, the corresponding slots of the several discs are aligned. Within the space or compartment 40 inside the ring 35 carrying its loop 33, each tape is diverted from or merged with the other tapes of its row, depending on its destination. Following a substantially radial path between the slots and associated drive rolls 42, the tape is caused to ride over another direction-changing idler roller 66 mounted adjacent each slot of its pair and having the same relative disposition as the idler rollers 62.

Intermediate exit from its feed slot 64 and its return through the related take-up slot 65, each tape forms one of the aforementioned abrasive loops 33. This is made by looping the tape through a pair of adjacent openings 41 in the ring 35, the tape passing out of the drum past the near side of the drive roll 42 of the nearest opening and returning to the drum past the side of the next or the adjoining roll correspondingly disposed relative to the take-up slot. The tape thus engages confronting faces of a pair of adjoining rolls and is driven by these rolls as it both leaves and returns to the drum, being held in contact with the drive rolls by the related pressure rolls 44. Since each tape is driven by a driving roll adjacent each end of its loop, it is only necessary to synchronize the speed of the drive rolls to ensure that the loop will retain its given size. Designed to exert yieldable pressure against a hide being treated, the abrasive depends for this pressure solely on the centrifugal force exerted on the loop of flexible tape by rotation of the drum. Each loop, therefore, projects or extends laterally beyond the periphery of the segment which it encloses a sufficient distance to prevent application of force through the segment to the hide. To facilitate understanding of the interrelation between the parts of the machine through which the abrasive tape passes, the course of a representative tape, from its feed spool, through the associated feed rolls, to its take-up spool has been illustrated schematically in Figure 22.

In practice, it has been found that the flexibility inherent in the abrasive tape causes an undesirable distortion of the form of the loop which increases in proportion to the speed of the drum. To limit such distortion and maintain the shape of the loop substantially uniform regardless of the speed of the drum, it is desirable to extend the outer surfaces of the several solid segments of each of the rings 35 between the openings 41 beyond the periphery of the drum proper, but short of the extremity of the loop, by the provision of either a separate or, as shown, an integral guide or backing element or shoulder 67. The surfaces of this element, contiguous to the bounding openings in the drum, are struck or patterned on the prescribed shape of loop. Depending upon the direction of rotation of the drum, one or the other of these surfaces, by engaging and backing-up the leading end portion of the loop, will cause the loop to conform and thus maintain the prescribed shape. Partially to guide the outer sides of the loops, but more as protection for the drive rolls 42 and additional rollers, are arranged in pairs for mounting purposes, each pair being mounted with the associated of the upper rollers 16 in a set on a stand 20 carried by the frame 1, with the rollers geared or connected for rotation in synchronism through the upper roller. With this construction, it is possible to drive the belts of the entire conveying system through a single take-off or drive pulley 21 which, for illustration, has been fixed to the shaft of the pulley at the discharge end of the machine.

There is provided at the feed end of the machine a feed table 22 of suitable type, on which a hide is initially placed to afford a surface for spreading or smoothing out the hide before its introduction into the machine. To facilitate feeding of a hide from the feed table into the machine, it has been found preferable to enable the gripping device or feed gripper 23 associated with the feed conveyor to be elevated by the operator as each hide enters. To this end, the lead roller 24 of the feed gripper 23 is journaled on links 25 carried by the support 20 of its following roller and the outer ends of the links are carried on pneumatic cylinders or like means 26, operated by a conventional foot pedal or other suitable control, not shown, by which the operator is enabled to raise the leading or feed end of the gripper to the position shown diagrammatically in Figure 2, as each hide is introduced. After introduction, the roller is lowered to its normal position shown in solid line, thereafter gripping the hide between the confronting belts of the gripper and feed conveyor.

Elimination of slack resulting from stretching of the belts encircling the end rollers at the two extremities of the movable support is readily accomplishable through any suitable means for pressing the axes of these rollers outwardly relative to their companion rollers, a resilient displacement being preferable to maintain the belts taut at all times. The same result is achieved for the belts of the intermediate conveyors 11 and their associated gripping belts 15 by take-up pulleys 27 mounted, above and below the intergeared sets of rollers 13 and 16, on the aforementioned cross-members 4 of the base members 2 and corresponding cross-members 28 carried by the uprights 5. To compensate for variations in stretch among the several belts, a pulley is provided for each belt and each pulley is journaled in an individual yoke 29 having a stem 30 projecting through the associated cross-member and carrying outwardly thereof resilient means in the form of a coil spring 31, held on the stem by a nut 32, for resiliently urging the yokes outwardly and thereby tautening the associated belt.

It has been previously mentioned that each of the pairs of buffing drums 7 has presented to it for treatment an entire surface of a hide and that each drum of the pair is designed to buff substantially half of that surface, the remainder of the surface in each case being obscured by the gripping belts 15 by which the hide is gripped to the confronting belts of the supporting conveyor 6. As a consequence, only that portion of the surface of each drum intermediate the gripping belts need carry abrasive, this also being desirable to prevent contact between the abrasive and the gripping belts with consequent undue wear of the latter. If only limited by the spacing of the gripping belts, each drum might be provided with spaced rings of abrasive. However, experience in buffing hides has shown that such rings of abrasive, even when resiliently backed, tend to burn or scorch a hide, and that the lightest possible touch or contact between abrasive and hide, consistent with buffing, is essential. The device of the present invention is designed not only to satisfy this requirement, but to provide means whereby the abrasive medium is continuously and automatically renewed, thus permitting an unlimited number of hides to be buffed in succession as a continuous operation. Supplying the requisite lightness of contact with a hide, the abrasive medium is in the form of a plurality of peripherally carried free or untensioned loops 33 arranged in groups spaced laterally in correspondence with the spacing of the exposed portion of the hide, each loop being part of an elongated strip or tape 34 of flexible abrasive, such as sandpaper, and being continuously renewed by feeding of the strip in the manner to be now described.

As shown in Figure 3, each of the drums 7 is comprised of a plurality of sections, segments or elements, of substantially equal width, in the form of abrasive loop-carrying or buffing rings 35 alternating with and spaced by spacers or spacer discs 36, these members being detachably connected to form the body of the drum by tie bolts 37. To facilitate construction as well as subsequent handling, the rings are arranged in pairs, each pair being attached to and preferably integral with the intervening spacer to form a ring member 38. To reduce the strain on the tie bolts 37, it is also preferred to bolt or otherwise detachably secure to one side of each of the ring members one of the separate discs, and further to interconnect these elements by drift pins 39.

The spaced compartments or chambers 40 within the rings 35, into which the interior of the drum is divided by the discs 36, serve to house the means whereby the abrasive in the loops 33 is continuously or progressively renewed. For this purpose, the peripheral wall or rim of each of the rings 35 is interrupted by a plurality of laterally or circumferentially spaced or arranged openings or passages 41, in or associated with each of which is mounted a drive roll 42, faced with rubber or other relatively non-slip material. For simplicity of operation, the drive rolls of the several segments are positioned in alignment and the rolls of each line or row are mounted on a common drive shaft 43, the drive shafts, like the drums, being formed of a plurality of interlocking sections. Confronting and adapted to bear against opposite faces of each of the drive rolls are pressure or bearing rolls 44 for holding the abrasive strips in tight contact with the drive rolls. In the form shown, the pressure rolls are arranged in pairs, one mounted or seated in the ring 35 on either side of the drive roll. The rolls of each pair are journaled in a carriage 45 having side plates 46 of T-section, the stems 47 of which slide in a correspondingly-formed recess 48 in the rim, being resiliently urged therefrom by a spring 49 of loop or other suitable shape. The spring preferably bears directly against a cap member 50 which abuts the inner end of the recess and is interlocked between the side plates for limited sliding or reciprocable movement of the latter relative thereto. The bottom portion of the spring may be carried on a web 51 connecting the side plates 46. So formed, the pressure rollers 44 are readily mounted as a unit in their respective recesses, and once positioned, are adapted resiliently to exert the pressure necessary to maintain driving contact between the drive roll and the abrasive tape.

It will be apparent that no provision is made for spooling the abrasive tape 34 within the compartments 40 of the several ring members 38. Instead, the tape is made readily accessible by the provision of a tape-carrying hollow cylinder, cage or member 52 connected to one end of each drum 7 and rotatable therewith, the tape being carried on the cage 52 in spools. In the illustrated embodiment in which a separate tape 34 is utilized for each of the several abrasive loops 33, there is provided for each of the tapes a feed or supply spool 53 and a take-up, drive or rewind spool 54, on each of which its opposite ends are wound. The corresponding drive rolls 42 of the several loop-carrying rings 35 of the drum, as well as the loops 33, being aligned in longitudinally extending, circumferentially spaced rows, a like disposition of the spools is preferred to avoid interference between the tapes of the respective rows. Thus, there are mounted about the spool-carrying cage in circumferentially spaced relation a plurality of spindles or shafts 55 and 56, each carrying either the feed spools or take-up spools of one row of loops, with the spindles 55 of the feed spools and those 56 of the take-up spools alternating, and the feed and takeup spools of each row of loops adjacent each other.

The ends of the several spindles 55 may be mounted in annular flanges 57 formed at either end of the cage 52, with the axes of the spindles preferably disposed parallel to that of the cage. The cage has an axial substantially cylindrical bore 58, having its wall interrupted by a plurality of spaced longitudinally extending ribs 59. To afford access of the tape to the bore or hollow interior 58 of the cage, there are provided in the intervening wall a plurality of longitudinally extending rows of spaced passages or slots 60, one passage for and substantially in line with each of the spools, alignment of each tape with its passage being assured, regardless of the amount of tape wound on the spool, by the provision of guide rods 61 adjacent the spools over which the tapes run intermediate the spools and their respective passages. The action of the guide rods is indicated in Figure 22, wherein is shown schematically the path of a typical tape.

The cage 52 being attached to one end of the drum, the tapes must travel substantially axially or longitudinally of the drum from the cage to the loop-carrying rings 35. To accomplish the change from the initial radial to this axial direction, there is associated with each of the passages 60 a direction-changing idler roller 62, which may conveniently be attached to the wall of the bore 58, intermediate the passages, by a stud 63. Disposed at substantially a forty-five degree angle axially of the cage for the desired ninety degree change of direction, the rollers enable the tape to accomplish this smoothly and without breakage. It will be seen that the several rollers, like the spools 53 and 54 and drive rolls 42, are arranged in rows such that the tapes of each row are caused to travel together as they enter the buffing drum, those of the feed spools being spaced radially inwardly of the cage to minimize interference by mounting them on the ribs 59.

To enable the tapes to pass through the spacer discs 36 of the drum to reach their several stations, each of the discs is apertured or interrupted by a plurality of substantially rectangular slots or apertures 64 and 65, a pair of slots being provided for each line of tapes, one, an inner or feed slot 64, for the new tape drawn from the feed spools and the other, an outer or take-up slot 65, for used tape withdrawn by the take-up spools. To afford continuous conduits or channels through the body of the drum, the corresponding slots of the several discs are aligned. Within the space or compartment 40 inside the ring 35 carrying its loop 33, each tape is diverted from or merged with the other tapes of its row, depending on its destination. Following a substantially radial path between the slots and associated drive rolls 42, the tape is caused to ride over another direction-changing idler roller 66 mounted adjacent each slot of its pair and having the same relative disposition as the idler rollers 62.

Intermediate exit from its feed slot 64 and its return through the related take-up slot 65, each tape forms one of the aforementioned abrasive loops 33. This is made by looping the tape through a pair of adjacent openings 41 in the ring 35, the tape passing out of the drum past the near side of the drive roll 42 of the nearest opening and returning to the drum past the side of the next or the adjoining roll correspondingly disposed relative to the take-up slot. The tape thus engages confronting faces of a pair of adjoining rolls and is driven by these rolls as it both leaves and returns to the drum, being held in contact with the drive rolls by the related pressure rolls 44. Since each tape is driven by a driving roll adjacent each end of its loop, it is only necessary to synchronize the speed of the drive rolls to ensure that the loop will retain its given size. Designed to exert yieldable pressure against a hide being treated, the abrasive depends for this pressure solely on the centrifugal force exerted on the loop of flexible tape by rotation of the drum. Each loop, therefore, projects or extends laterally beyond the periphery of the segment which it encloses a sufficient distance to prevent application of force through the segment to the hide. To facilitate understanding of the interrelation between the parts of the machine through which the abrasive tape passes, the course of a representative tape, from its feed spool, through the associated feed rolls, to its take-up spool has been illustrated schematically in Figure 22.

In practice, it has been found that the flexibility inherent in the abrasive tape causes an undesirable distortion of the form of the loop which increases in proportion to the speed of the drum. To limit such distortion and maintain the shape of the loop substantially uniform regardless of the speed of the drum, it is desirable to extend the outer surfaces of the several solid segments of each of the rings 35 between the openings 41 beyond the periphery of the drum proper, but short of the extremity of the loop, by the provision of either a separate or, as shown, an integral guide or backing element or shoulder 67. The surfaces of this element, contiguous to the bounding openings in the drum, are struck or patterned on the prescribed shape of loop. Depending upon the direction of rotation of the drum, one or the other of these surfaces, by engaging and backing-up the leading end portion of the loop, will cause the loop to conform and thus maintain the prescribed shape. Partially to guide the outer sides of the loops, but more as protection for the drive rolls 42 and additional spacing means, each of the drive roll-containing openings 41 may be partially enclosed by a crescent-shaped guard 68 integral with the ring member.

With the tape of each of the abrasive loops 33 engaging a drive roll 42 adjacent either end, movement of the tape relative to the drum to control the rate of replacement, replenishment or renewal of the treating surface is dependent primarily upon the rotative movement imparted to these rolls independently of the drum, this being obtained in the manner hereafter to be described. However, such movement must be accompanied by movement of the tape at the same linear speed at both feed and take-up spools to eliminate slack in the tape and avoid subjecting it to tension beyond its limit. For the take-up spools, this requires that the shafts 56 on which they are mounted be independently driven, this being accomplished in the illustrated embodiment by journaling the ends of these shafts in sleeve or other bearings 69 and keying or otherwise affixing to the inner end of each shaft a planetary gear 70. These gears engage a ring gear 71 rotatably mounted adjacent the corresponding end of the tape cage 52, the ring gear, in turn, being driven at the necessary speed by a driving gear 72 obtaining its power through a drive pulley or the like 73.

Maintenance of a uniform linear speed of the tape at both the drive rolls 42 and the spools would normally require complex speed-changing mechanism for the spools, to compensate for the continuously varying amount of tape wound thereon. Therefore, a particular feature of the invention is the construction of the several spools by which this requirement is avoided. The preferred form of both feed and take-up spools is illustrated in Figures 11 and 12. As there shown, each spool comprises a pair of spaced end discs or plates 74 which are removably attached to a hub portion 75 by screws or like means 76. This hub portion is in part hollow and houses in the cavity or aperture 77 so provided an arcuate wedge or wedge member 78, adapted partly to encircle the spindle and yieldably pressed into frictional engagement therewith by a leaf spring or like means 79. Utilizing spools of this type, it is possible to drive the take-up spools 54 through their spindles 56 without other connection therebetween than the frictional engagement of the wedges. In such application, the elimination of keying has the added advantage of permitting relative movement between slippage of the spools, relative to their spindles. Consequently, the yieldable grip of each spool need only to be held below the grip exerted on the tape between the drive rolls and their related pressure rolls 44 and, of course, the tensile strength of the tape, to enable the drag of the tape on the spool to cause sufficient slippage of the latter relative to its spindle to vary the speed of the spool in accordance with the amount of tape wound on it. The same type of spool, employed as the feed spool, with the shafts 55 locked against independent rotation, enables the tape to be drawn therefrom at a uniform rate and eliminates any chance of back-lash by overrunning of the spools. Utilizing the yieldable grip so predetermined, it is possible to maintain the linear speed of the tape uniform at both spools and driving rolls, in process keeping the tape taut without danger of breakage.

Each of the abrasive drums 7 and its attached spool cage 52, together with its associated mechanisms, is mounted as an assembly on the frame 1, permitting their number and relative disposition to be varied at will. Within each of these assemblies, a drum and its attached cage is removably mounted by the provision of split journals or housings, one, 80, journaling a hollow throat member or necked cylinder 81 intermediate and connecting the drum and its cage and the other, 82, a stub axle or trunnion 83 projecting from the opposite end of the drum. As shown, the throat member 81 also serves to rotatably mount the aforementioned ring gear 71 through which the take-up spindles 56 are driven. This gear rotates between a split bushing 84 collaring the throat member and the confronting of the annular flanges 57 of the tape cage 52.

The stub axle 83 is hollow and outwardly of its journal 82 has a toothed or serrated outer end 85 which normally engages a correspondingly toothed end 86 of a sleeve 87 carried by a hollow or tubular drive shaft 88. The sleeve 87 is keyed to its shaft 88 for rotation with it, but, at the same time, is slidable longitudinally or axially of the shaft and fixable in two positions relative thereto by the spring-pressed plunger 89, one position in engagement with and the other removed from the end 85 of the stub axle 83. Within and extending through the stub axle 83, is a second or inner driven shaft 90 which is adapted to separably couple with an inner drive shaft 91, in and rotatable relative to the hollow drive shaft 88. This separable coupling may be obtained through the provision of a collar 92 keyed to the inner driven shaft 90 and normally interlocked with a collar 93 carried by the inner drive shaft 91, the latter collar being slidable axially of its drive shaft within the sleeve 87 to permit uncoupling of the inner shafts. With separable couplings provided for both inner and outer shafts, the drum is readily demountable from its split journals.

Of the two driven shafts, the stub axle 83 is the means whereby rotative movement is imparted to the drum. The second, or inner, driven shaft 90 carries at its inner end within an enclosed end portion 94 of the drum abutting and bolted to the end of the buffing section or body of the drum, a sun gear 95 which, through planetary reduction gearing 96, drives the shafts 43 of the several drive rolls 42 in synchronism.

Referring now to Figure 18, there is there shown in detail the mechanism for rotating or driving each drum 7 and its drive roll 42. This mechanism is preferably housed in a gear box 97 and comprises two trains of gears driven off a common drive shaft 98 through a drive pulley or the like 99 outside the box. One, or the inner, of these trains of gears 100 drives the outer or hollow drive shaft 88 and the other, or outer, train 101, the inner drive shaft 91, thereby independently driving or rotating the drum and drive rolls, respectively. While the relative speeds of the drum and drive rolls could be varied by driving them through separate shafts, it is preferred to utilize the common shaft 98 and detachably mount the upper and intermediate gears 102 and 103, respectively, of the outer or drive roll gear train 101 such that gears giving a different gear reduction, and thus the desired different speed ratio, can be substituted therefor. To enable the substitute gears to intermesh, provision is made for shifting the position of the axle 104 of the intermediate gear 103. Such substitution should be accompanied by a like change in the gear ratio of the drive of the take-up spools 54, this being accomplished where both drive rolls and spools are driven off a common main drive shaft by a corresponding variation in the reduction ratio to the take-up spools through replacement of either their drive gear 72, their drive pulley 73, or both.

It will be seen that there is mounted on the frame 1, above each of the drums 7, an I-beam 105, each of these beams being disposed parallel to the axis of its associated drum and serving as an overhead track on which runs a hoist or lift 106. While breakage of the abrasive tape 34, once the buffing machine is in operation, is minimized by the previously described mechanism by which the tape is fed through the machine, initial loading of the drums requires a rather intricate threading of the tapes through the several apertures and openings through which they are designed to pass. It is partly for this purpose that the drums are made in detachable sections, their journals are split and the couplings through which the drums and drive rolls are driven are separable. So constructed, the drums can be taken down for loading outside the machine and, after being reassembled, carried between the belts of the associated gripping devices 14 and lowered into their mountings in their respective subassemblies by the hoists 106. The supply of tape on the several feed spools 53 will, of course, become exhausted with time and the take-up spools 54 be correspondingly loaded, necessitating their removal. However, such removal will be required infrequently, a spool of the relative size illustrated holding some forty-three feet of abrasive tape of a grade of sandpaper normally used on hides, and an advance or feed of as little as one-eighth of an inch per minute being sufficient to insure continuous replacement of the treating surfaces When replacement of the spools does become necessary, disassembly of the drums for rethreading is readily avoided by joining the ends of the new and old tapes by a suitable adhesive.

It has been previously mentioned that the portions of a hide subjected to treatment are supported during treatment on a back-up roll 18, the hide-supporting surface or periphery 17 of which is interrupted by a plurality of grooves 19 through which the supporting and gripping belts 12 and 15 pass. As are the drums 7, each of the back-up rolls, too, is preferably made in a plurality of segments 107, these being rotatably mounted on a supporting shaft 108. Each of these segments is in the form of a necked idler roll, the head 109 of which engages and supports the undersurface of one of the exposed strips of the hide, and the neck 110, of restricted cross-section, provides one of the grooves 19 in which the belts are received. Since rotated merely by their engagement with the supporting belts 12, the individual idler rolls 107 need not be connected but may be positioned in end-abutting relation with their positions relative to the associated drum fixed, as by means of a spacer sleeve 111 at one or, if necessary, both ends of the supporting shaft 108. To prevent overlapping of the buffing of the drums of each pair, with consequent lack of uniformity in the buffing treatment, the heads 109 of the idler rolls have rounded edges at either side of their peripheral surfaces, so to limit the portion of the hide backed-up to that directly underlying the confronting abrasive loops 33.

Utilizing the described abrasive loops 33, the abrading action on a hide can be made lighter than that obtainable with an abrasive medium held in abrading position by separate backing, regardless of the resiliency of the latter. To enable the abrading action further to be controlled such that any desired degree of abrasion may be obtained, provision is made for vertical adjustment of the back-up rolls 18 relative to their associated drums 7. This may be accomplished by journaling either end of the supporting shaft 108 of each back-up roll in a hanger or bracket 112 slidably mounted on a slide 113 and adjustable in position relative thereto through threaded engagement with a stem or shaft 114. The threaded stem 114 of each bracket has keyed to it below the associated slide 113 a worm pinion 115 which is rotated through a worm gear 116. Both worm gears are carried by a common worm shaft 117 to which rotation may be imparted by a hand wheel 118, thus to adjust the spacing of each of the associated back-up rolls 18 relative to its drum and the degree of abrasion performed by the abrasive loops of the latter. As shown, each worm shaft is preferably made of separable parts which may be connected by universal joints 119 so that its length may be varied as desired.

With the buffing machine constructed in the above manner, alternate strips of a hide are presented for buffing or treatment by the buffing drums 7 of each pair such that the several pairs of drums will each buff an entire surface of a hide. The manner in which the supporting and gripping belts 12 and 15 are staggered to achieve this result has already been explained. Correspondingly staggering of the lateral positions of the abrasive loops 33 of the several drums and hide-supporting peripheries 17 of the associated back-up rolls 18 is readily obtainable by the described sectionalized construction by varying the arrangement or order of the juxtaposed standard elements of which these members are formed. Thus, in the drum shown in Figure 3, a spacer disc 36 is interposed between the loop-carrying ring member 38 and the reduction gear-enclosing end portion 94 of the drum. For the companion drum of the pair, the arrangement would be exactly opposite, with the end spacer disc at the opposite end of the drum, thereby laterally displacing each group of loops, one section toward the drive end of the drum, relative to the loops of the drum of Figure 3 and covering the strips of hide untreated by the latter drum. For the back-up roll of the companion drum, a mere reversal in direction of each of the roller segments 107 is required. This sectionalized construction has the further advantage that the same standard units can be utilized to construct drums and back-up rolls of any desired length and thus treat hides of any width.

Summarized briefly the operation of the buffing machine, a hide is first placed on the feed table 22 where it may be smoothed by the operator and then fed into the feed end of the supporting conveyor 8, the operator in process raising the feed end of the gripping device 14. On subsequent lowering of the latter device, the hide, gripped between the supporting and gripping belts 12 and 15, is carried through the machine. By virtue of the staggered relation of the abrasive loops 33 of the adjoining drums 7 and the corresponding staggering of the belts, alternate strips of the hide are treated by successive drums, each pair of drums thus treating the entire surface of the hide. Each successive pair of drums will normally carry a finer abrasive than the preceding pair, the relative fineness being determined by the characteristics of the hides being treated. In any case, the abrasive selected will be of such type, and the degree of abrading so controlled through adjustment of the spacing between the drums and their back-up rolls, that the hide will be buffed automatically during its travel through the machine and finished as it leaves the machine. Also, due to the continuous replacement or renewal of the abrading surfaces of the abrading loops, the buffing will be uniform. The automatic operation may also be extended to include the feeding of the hides into the machine, raising of the feed end of the gripping device being then automatically synchronized with the introduction of a hide by utilizing a timing control such as disclosed in my copending application, Serial Number 703,571.

From the above detailed description it will be apparent that there has been provided an improved buffing machine by which sheet material is both securely gripped and has a surfaced buffed in its entirety during its travel through the machine, the machine automatically renewing its abradent and having such nicety of control of the degree of abrading as to avoid burning or scorching of the material. It should be understood that the described and disclosed embodiment is merely exemplary of the invention and that all modifications are intended to be included which do not depart either from the spirit of the invention or the scope of the appended claims.

Having described my invention, I claim:

1. A buffing machine comprising a plurality of groups of spaced movable belts arranged to receive and support work in sequence, said belts of each of said groups overlapping and being interleaved with belts of an adjoining group, a plurality of sets of gripping belts, said gripping belts of each set confronting supporting belts of one of said groups for gripping work therebetween and alternately exposing intervening portions thereof, a plurality of rotary buffing drums associated with said belts, each of said drums confronting one of said groups, and a plurality of groups of abrasive loops carried by and projecting peripherally beyond each of said drums, said groups being spaced in correspondence with the spacing of the associated belts for buffing the portions of work exposed thereby.

2. A buffing device comprising a rotary drum, means for feeding abrasive tape peripherally of said drum, a plurality of spindle-mounted spools rotatable with said drum for supplying and taking up said tape, means for driving said feeding means and take-up spools, and means yieldably resisting movement of said spools relative to said spindles for compensating for the varying thickness of the tape on said spools and enabling the linear speed of said tape to be maintained substantially constant throughout said device.

3. A buffing machine comprising a plurality of laterally spaced supporting belts, a plurality of laterally spaced gripping belts each confronting one of said conveyor belts for spacedly gripping work therebetween and exposing a portion of a surface thereof, rotary means associated with said belts, a plurality of abrading members carried by said rotary means, said members being spaced in correspondence with the spacing of said belts for buffing the exposed surface of said work and a back-up roll grooved in correspondence with the spacing of and receiving said belts for supporting said exposed surface during buffing thereof.

4. A buffing machine comprising a plurality of laterally spaced conveyor belts, a plurality of gripping belts, each confronting one of said conveyors for spacedly gripping work therebetween and exposing portions of said work, a rotary member associated with said conveyor belts and peripherally carrying a plurality of strips of abrasive for buffing said exposed portions of said work, and a back-up roll adjacent said rotary member, said back-up roll supporting said exposed portions during buffing thereof and having a plurality of grooves corresponding in spacing to said belts, said belts passing through said grooves and maintaining said grip on said work during said buffing.

5. A buffing machine comprising a plurality of laterally spaced conveyor belts, a plurality of gripping belts, each confronting one of said conveyor belts for spacedly gripping work therebetween and exposing portions of said work, a rotary member associated with said conveyor belts and peripherally carrying a plurality of strips of abrasive for buffing said exposed portions of said work, a back-up roll adjacent said rotary member, said back-up roll supporting said exposed portions during buffing thereof and having a plurality of grooves corresponding in spacing to said belts, said belts passing through said grooves and maintaining said grip on said work during said buffing, and means for varying the spacing between said roll and said rotary member.

6. A buffing device comprising a rotary drum having a plurality of circumferentially spaced openings interrupting a peripheral wall thereof, a drive roll associated with each of said openings, means connected to said drum for carrying abrasive tape, said tape passing through pairs of adjacent openings and projecting in circumferentially spaced loops beyond the periphery of said drum, said drive rolls engaging said tape adjacent opposite ends of each of said loops, and means for continuously driving said drive rolls in synchronism.

7. A buffing device comprising a rotary drum having a plurality of circumferentially spaced openings interrupting a peripheral wall thereof, a drive roll associated with each of said openings, means connected to said drum for carrying abrasive tape, said tape passing through pairs of adjacent openings and projecting in circumferentially spaced loops beyond the periphery of said drum, guide means exterior of said drum within said loops for engaging and guiding end portions thereof, said drive rolls engaging said tape adjacent opposite ends of each of said loops, and means for driving said drive rolls in synchronism.

8. A buffing device comprising a drum formed of a plurality of connected sections, certain of said sections being chambered and having their peripheral walls interrupted by a plurality of circumferentially spaced openings, a drive roll associated with each of said openings, means connected to said drum for supplying abrasive tape, said tape passing through pairs of adjacent openings in each of said certain sections and projecting in circumferentially spaced loops beyond the periphery of said drum, said drive rolls engaging said tape adjacent opposite ends of each of said loops, each of said loops intermediate said rolls being unbacked and means for driving said drive rolls in synchronism.

9. A buffing device comprising a rotary drum formed of a plurality of connected sections, certain of said sections being chambered and having their peripheral walls interrupted by a plurality of circumferentially spaced openings, a drive roll associated with each of said openings, means connected to said drum for supplying abrasive tape, said tape-carrying means and other of said sections being apertured for passage of said tape interiorly therethrough to said chambered sections, said tape passing through pairs of adjacent of said openings in each of said chambered sections and projecting therefrom in circumferentially spaced loops beyond the periphery of said drum, said drive rolls engaging said tape adjacent opposite ends of each of said loops, each of said loops intermediate said drive rolls being unbacked and means for driving said drive rolls in synchronism.

10. A buffing device device comprising a rotary drum formed of a plurality of connected sections, certain of said sections being chambered and having their peripheral walls interrupted by a plurality of circumferentially spaced openings, a drive roll associated with each of said openings, a member connected to and rotatable with said drum, a plurality of tape-carrying spools mounted on said member, said member and other of said sections being apertured for passage of said tape interiorly thereof to said chambered sections, said tape passing through pairs of adjacent of said openings in said chambered sections and projecting as circumferentially spaced loops beyond the periphery of said drum, said drive rolls engaging said tape adjacent opposite ends of each of said loops, each of said loops intermediate said drive rolls being unbacked means for driving said drive rolls in synchronism, and means associated with said spools enabling the linear speed of said tape to be maintained substantially constant throughout said device.

11. A buffing device comprising a rotary drum having a plurality of circumferentially spaced openings interrupting a peripheral wall thereof, means associated with said drum for carrying abrasive tape, said tape passing through pairs of adjacent openings and projecting therebetween peripherally of said drum in circumferentially spaced loops, a drive roll associated with each of said openings and drivably engaging adjacent ends of adjacent of said loops, and means for driving said rolls in synchronism.

12. A buffing device comprising a rotary drum having a plurality of circumferentially spaced openings interrupting a peripheral wall thereof, means associated with said drum for carrying abrasive tape, said tape passing through pairs of adjacent openings and projecting therebetween peripherally of said drum in circumferentially spaced loops, a drive roll associated with each of said openings and drivably engaging adjacent ends of adjacent of said loops, yieldable means associated with each of said rolls for pressing the engaged ends of said adjacent loops thereagainst, and means for driving said rolls in synchronism.

13. In a buffing device wherein abrasive tape is fed peripherally of a drum, tape take-up means comprising a spool, means for driving said spool at a given ratio relative to the feed of said tape, and yieldable friction means drivably connecting said spool and drive means and permitting slippage therebetween for enabling the linear speed of said tape to be determined by said feed.

14. A buffing device comprising a rotary drum, means for feeding abrasive tape peripherally of said drum, a plurality of spools separate from and rotatable with said drum for supplying and taking up said tape, means for driving said feeding means, means for rotating said spools independently of said drum, and means associated with said spools for enabling the linear speed of said tape to be maintained substantially constant throughout said device.

15. A buffing device comprising a rotary drum, means for feeding abrasive tape peripherally of said drum, a plurality of spools separate from and rotatable with said drum for supplying and taking up said tape, means for driving said feeding means, means for rotating said spools independently of said drum, and means carried by said spools for enabling the linear speed of said tape to be maintained substantially constant throughout said device.

16. A buffing machine comprising buffing means, conveyor means for conveying work for buffing by said buffing means, gripping means, each of said conveying and gripping means including a plurality of longitudinally overlapping sets of transversely spaced belts, each of said belts of said gripping means confronting and moving with one of said belts of said conveyor means for gripping said work therebetween, said belts of overlapping sets being relatively staggered for exposing alternate portions of work for buffing by said buffing means, and back-up means associated with said belts for suporting said exposed portions during buffing thereof.

17. A buffing machine comprising a plurality of buffing devices each carrying a plurality of transversely spaced abrading elements, conveyor means for conveying work for buffing by said buffing devices, gripping means, each of said conveyor and gripping means including a plurality of longitudinally overlapping sets of belts spaced transversely in correspondence with the spacing of said abrading elements, each of said belts of said gripping means confronting and moving with one of said belts of said conveyor means for gripping said work therebetween, said belts of overlapping sets being relatively staggered for exposing alternate portions of work for buffing by said buffing devices, and back-up means associated with each of said buffing devices and grooved to receive said belts of said conveyor means for supporting said exposed portions during buffing thereof.

18. A buffing device comprising a drum, abrasive tape supplying means connected to said drum, circumferentially spaced openings in a periphery of said drum, said tape passing through adjacent of said openings and projecting as a loop beyond said periphery, and means for continuously renewing said abrasive in said loop, said renewing means including synchronized drive means engaging said tape adjacent each end of said loop, said loop intermediate said drive means being unbacked.

19. A buffing device comprising a drum, abrasive tape supplying means connected to said drum, circumferentially spaced openings in a peripheral wall of said drum, said tape passing through pairs of adjacent openings and projecting in circumferentially spaced loops beyond the periphery of said drum, and means for continuously renewing said abrasive in said loops, said means including synchronized drive rolls one associated with each opening, said drive rolls engaging said tape adjacent opposite ends of each of said loops, and each of said loops intermediate said drive rolls being unbacked.

20. A buffing device comprising a drum, abrasive tape supplying means connected to said drum, circumferentially spaced openings in a peripheral wall of said drum, said tape passing through pairs of adjacent openings and projecting in circumferentially spaced loops beyond the periphery of said drum, and means for continuously renewing said abrasive in said loops, said means including synchronized drive rolls one associated with each opening, said drive rolls engaging said tape adjacent opposite ends of each of said loops, each drive roll being common to and driving adjacent ends of adjacent loops, and each of said loops intermediate said drive rolls being unbacked.

References Cited in the file of this patent

UNITED STATES PATENTS

| Number | Name | Date |
|---|---|---|
| 188,569 | Beers | Mar. 20, 1877 |
| 737,621 | Haskell | Sept. 1, 1903 |
| 864,923 | Saunders | Sept. 3, 1907 |
| 1,860,713 | Jones | May 31, 1932 |
| 2,198,047 | Wick | Apr. 23, 1940 |
| 2,236,078 | Walter | Mar. 25, 1941 |
| 2,405,328 | Robinson, Jr. | Aug. 6, 1946 |